United States Patent [19]

Futch et al.

[11] Patent Number: 4,890,417
[45] Date of Patent: Jan. 2, 1990

[54] BANK PLANTER

[76] Inventors: John E. Futch, 3633 Echo Springs Rd., Lafayette, Calif. 94549; James J. Corbett, 30 Hetfield Pl., Moraga, Calif. 94556

[21] Appl. No.: 276,204

[22] Filed: Nov. 23, 1988

Related U.S. Application Data

[62] Division of Ser. No. 76,871, Jul. 23, 1987, Pat. No. 4,809,460.

[51] Int. Cl.⁴ ............................................. A01G 1/00
[52] U.S. Cl. ............................................ 47/58; 47/33
[58] Field of Search .............. 52/102; 24/17 B; 47/33; 256/24

[56] References Cited

U.S. PATENT DOCUMENTS

| | | | |
|---|---|---|---|
| 1,277,483 | 9/1918 | Rogers | 24/17 B |
| 2,061,631 | 11/1936 | Law | 47/33 |
| 2,911,794 | 11/1959 | Pearson | 47/33 |
| 2,997,277 | 8/1961 | Schwartz | 47/33 |
| 3,316,721 | 5/1967 | Heilig | 47/33 |
| 3,412,561 | 11/1968 | Reid | 47/33 |
| 3,537,687 | 11/1970 | Adelman | 47/33 |
| 3,537,688 | 11/1970 | Stein | 256/24 |
| 4,647,491 | 3/1987 | Ireland | 47/33 |

FOREIGN PATENT DOCUMENTS 311102 1/1956 Switzerland ............................. 47/33

Primary Examiner—Henry E. Raduato
Attorney, Agent, or Firm—Phillips, Moore, Lempio & Finley

[57] ABSTRACT

An elongated member having one arcuate shaped edge and on the opposite side a straight edge may be used to plant vegetative matter on a bank or hill. The elongated member is curved into a semi-circle and held in place by spikes so that a planting hole may be formed on the uphill side thereof.

2 Claims, 2 Drawing Sheets

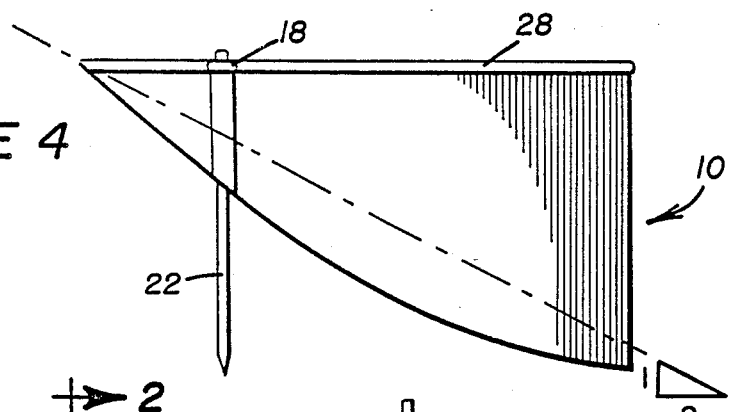
FIGURE 4
FIGURE 3
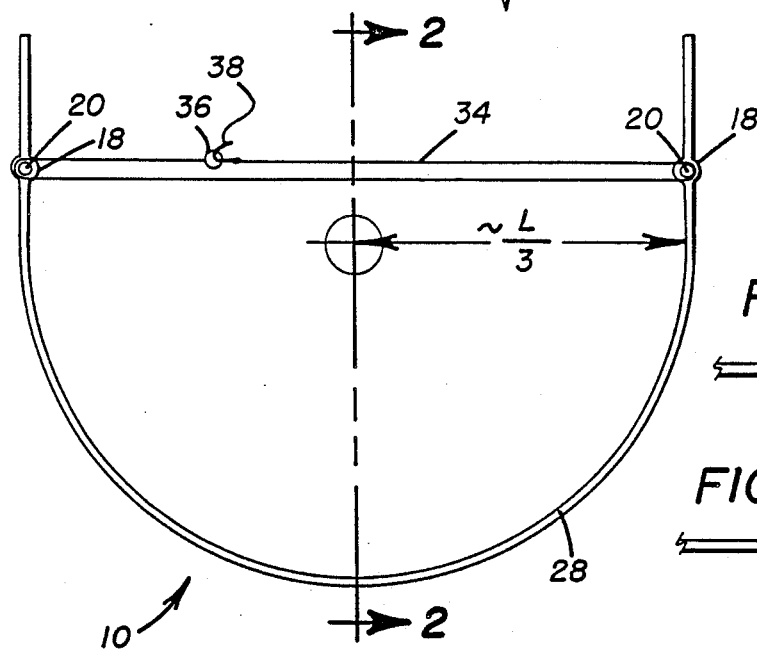
FIGURE 6
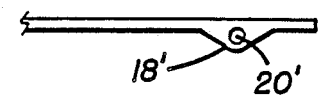
FIGURE 7
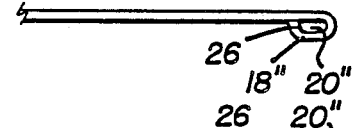
FIGURE 8
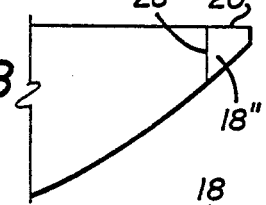
FIGURE 5
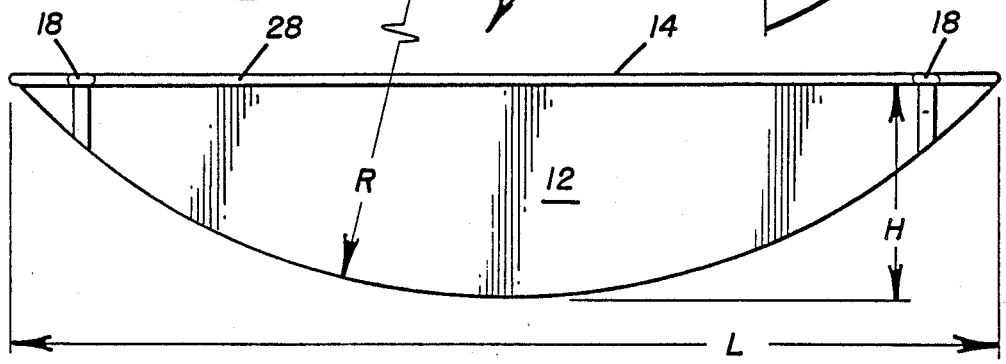

BANK PLANTER

This is a division, of Ser. No. 076,871, filed July 23, 1987 and now U.S. Pat. No. 4,809,460.

This invention relates to a soil retainer to be used for planting vegetation on a bank and a method for using the soil retainer.

BACKGROUND OF THE INVENTION

Over the years, horticulturalists and landscape architects have made serious efforts to plant banks with vegetative material. The purpose of such planting is twofold. From the environmental stand-point, an unplanted bank may be subject to severe erosion by water run off. Secondly, an unplanted bank can be unsightly. These two problems are particularly evident in highway construction and new home construction where excavation has exposed unsightly subsoil.

The exposure of such subsoil creates its own problem in that it is difficult if not impossible to grow a heavily rooted ground cover in such material due principally to a lack of soil nutrients and the like.

While not as serious from the infertile soil stand point, the decorative planting of a hillside can also prove difficult when the slope of the hill is significant. Generally a naturally formed hill with native vegetation is not as subject to erosion as man made hills and man made excavations, however, when a landscape designer disturbs natural vegetation on a hill, generally the holding capability of the natural vegetation is lost and erosion is the natural result.

While erosion and soil deficiencies may accompany attempts to plant on a slope, a serious problem arises when the vegetation itself is washed down the hill either by natural water accumulation or by irrigation to keep the plant alive.

Finally, it is always difficult to ensure that vegetation planted on a slope receives an adequate water supply. Without some sort of retention built around the plant, the result usually is water flowing down the hill rather than seeping into the ground around the plant's roots to properly supply the plant with water.

In order to solve, or at least address some of the problems set forth above, it has been common practice to form terraces on a bank with the vegetation being planted in the flattened portion of the terrace. Such efforts, while successful in the agricultural environment generally are usually not used in less extensive projects, simply because of the cost in earth moving.

On a lesser scale retaining walls have been used consisting of rather large scale concrete or stone walls to smaller styles such as rail road ties and the like. The latter being utilized quite frequently in home-type landscaping.

While the aforesaid methods and devices have been utilized in more permanent installations where costs are not necessarily a controlling factor, they all result in restructuring of the bank's slope. When it is desirable to retain the natural or manmade slope of the bank, terraces or retaining walls are not appropriate. In these situations it has been common to construct some sort of a temporary planting hole or the like. In the simplest method a hole is dug directly into the bank with the plant planted directly in the hole. In these instances, it is not uncommon for the bank and the plant to wash away due to the necessary watering of the plant.

In order to avoid erosion landscape architects and landscape designers have utilized a board, a piece of a flower pot, or any other relatively permanent piece of material to retain the bank adjacent the plant for at least a time sufficient to establish the plant on the bank. There are several objections to such temporary structures. First, they are generally unsightly in that they are not designed for the purpose they are being put to. Secondly, in the case of wood or metal, the structure usually deteriorates in a relatively short period of time thereby becoming useless at a time when its retentive properties may be very important.

Accordingly it is an object of this invention to provide a soil retention means for use on a sloped surface in conjunction with planting agricultural material.

It is a further object of this invention to provide such soil retention means that is aesthetically pleasing.

It is still a further object of this invention to provide a relatively inexpensive soil retention means having a relatively long life span.

Finally, it is an object of this invention to provide a method for using such a soil retention means.

BRIEF DESCRIPTION OF THE PREFERRED EMBODIMENT

The present invention is an elongated flexible member having one arcuate edge and one straight edge with the straight edge disposed opposite the arcuate edge. Also included are at least two spike members. The elongated flexible member is formed to receive the spike members at either end thereof in a manner substantially normal to the straight edge.

Also, the invention includes a method for planting horticultural material on a bank using an arcuate retainer comprising the steps of scoring a semi-circular line on the surface of the bank with the open side of the semi-circle facing uphill; placing the arcuate soil retainer in the scored semi-circle; fixing the arcuate soil retainer to the bank with at least two spikes; excavating a pit behind the soil retainer on the uphill side thereof and within the arcuate portion; placing the horticultural material in the excavated pit; filling the excavated pit with planting material, and; forming a berm around the inside of the arcuate soil retainer.

BRIEF DESCRIPTION OF THE DRAWING

FIG. 3 is a plan view of the soil retainer in its formed position.

FIG. 4 is an elevation view of the soil retainer showing it in relation to a two to one slope.

FIG. 5 is an elevation view of the soil retainer in its unformed position.

FIG. 6 is a first alternate structure for the spiked holding member.

FIG. 7 is a second alternate structure of the spike holding member.

FIG. 8 is an elevation view of the spike holding member shown in FIG. 7.

DETAILED DESCRIPTION OF THE PREFERRED EMBODIMENT

Figure 1:
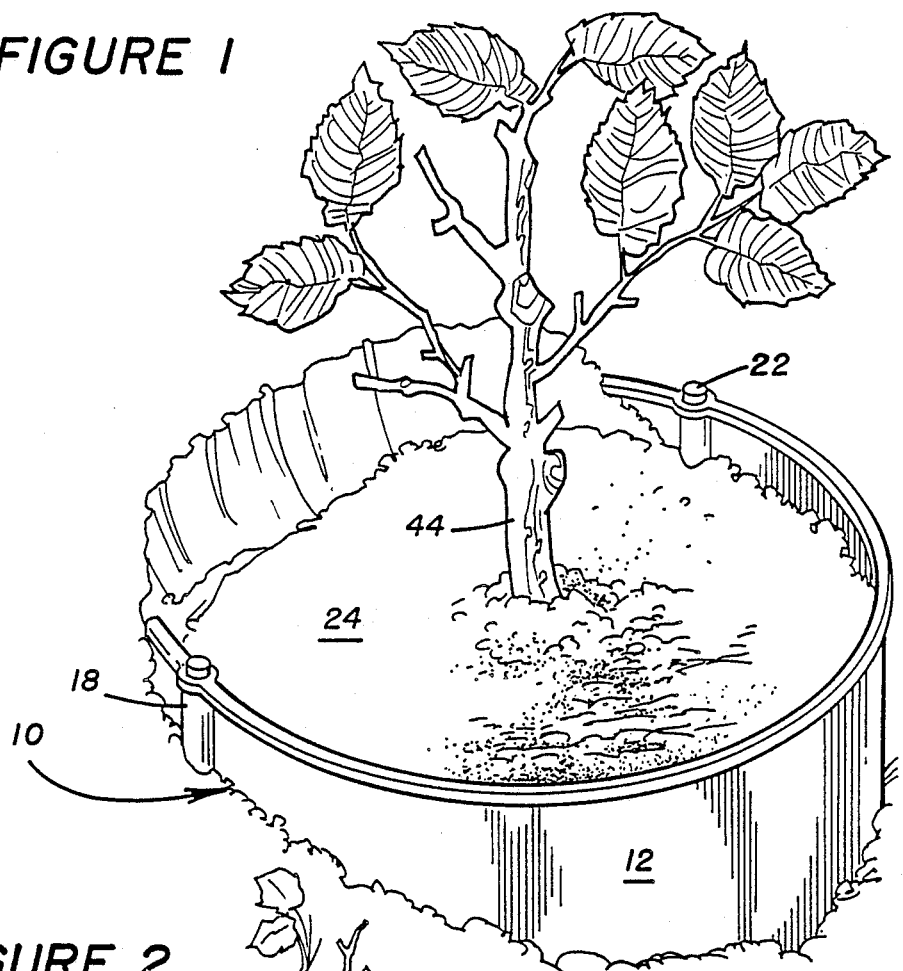
FIG. 1 is a perspective view of the soil retainer in use.

Referring to FIG. 1, a soil retainer 10 is shown in perspective. Soil retainer 10 is formed of an elongated flexible member 12 shown in elevation in FIG. 5. Preferably the elongated flexible member is made of a material that is relatively long lasting in the environment. The material should have the properties of being flexible as it is envisioned as being formed in the shape shown in FIG. 1 from a flat shape as shown in FIG. 5. Further, it should not be susceptible to degradation by ultraviolet radiation. Finally, it should be relatively inert in relation to the natural chemicals found in soil and the chemicals utilized for fertilizer and insecticides. The material selected should be easily formed and be inexpensive.

While the various metals might meet some of the above requirements, either the cost or the level of corrosion or both would rule out such use. Accordingly, the most desirable material would be one of the made made polymers such as polyethylene, polypropylene or a polycarbonate. It is recognized that many of the compositions coming from these plastic groups would not have all the properties listed above, however, generally speaking all of such properties can be found in some of these plastics. The retainer is preferably molded.

Referring now to FIG. 5, the soil retainer is formed in a particular shape. Namely the soil retainer should have a straight upper edge 14 and an arcuate lower edge 16. Formed at each end of the elongated member 12 are sockets 18. Sockets 18, as best seen in FIG. 3 are formed with a bore 20 adapted to receive a spike 22. As can be seen from FIG. 3, bore 20 has a length at least equal to the height of the retainer at the position of the socket 18.

Spike 22 forms an important part of the invention in that it holds the soil retainer on the hill. The spike itself should be as close to nonbiodegradable as possible. It has been found that fiberglass rods are appropriate for this purpose. Fiberglass rods are somewhat flexible yet sufficiently rigid so that they may be driven into the ground in the manner of a metal stake. Fiberglass has a high resistance to degradation by soils and chemicals and the like and is relative light weight.

The structure described herein is formed for a representative slope of one foot rise for every two feet of run. This is shown in FIG. 4 with the retainer installed in the bank. In order to attain the proper dimensions, it has been found appropriate that the height H should be approximately one fourth of the length L as shown in FIG. 5. The radius of the arcuate lower edge 16 should be approximately two thirds of the length L of the sector of the circle which is represented by the flexible member shown in FIG. 5. These dimensions will provide a soil retainer adequate to perform on a slope having a rise to run ratio of one to two. For a retainer on a bank having a rise to run ratio of one to one the height H should be approximately one third of the length L as shown in FIG. 5.

The dimension of the curved form of the soil retainer 10 as shown in FIG. 3 is important, as it determines the size of the eventual planting area 24 (see FIG. 1) that will be available for eventual use. Referring again to FIG. 3, the radius of the circle formed by the retaining member is approximately one third the length of the unformed retaining member as shown in FIG. 5.

In one embodiment of this structure for a one to two slope, the length L was set at 34 inches (186.36 cm) while the height H was eight and one half inches (21.6 cm). This gave a radius R of approximately 21.25 inches (53.97 cm) and a planting radius L/3 of roughly ten inches (25.4 cm).

If the rise to run ratio is one to one, for a 34 inch (86.36 cm) long retainer giving a planting radius L/3 of 10 inches (25.4 cm), H should be about 11.33 inches (28.78 cm) and the radius R should be about 18.4 inches (46.74 cm).

It has been found that the spike 22 is appropriately somewhat longer than the height H in order to properly anchor the device to the bank.

Figure 2:
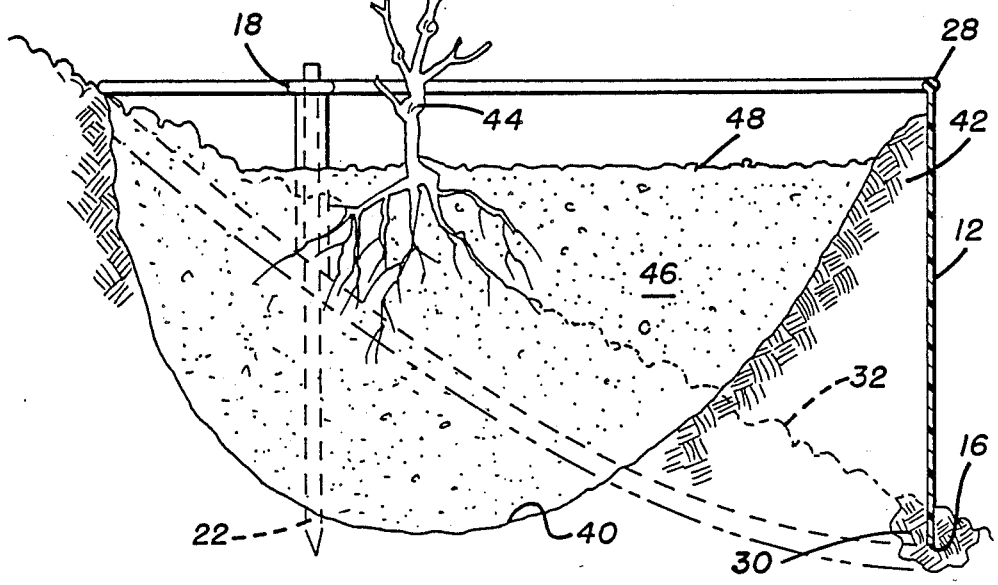
FIG. 2 is a sectional view of the soil retainer in use taken at section line 2—2 of FIG. 3.

Finally, it may be appropriate to form the elongated flexible member 12 with a rib 28 on the straight upper edge 14 of the elongated flexible member. Rib 28 is appropriate to give a certain degree of stiffness to the elongated flexible member when it is placed on a bank as shown in FIGS. 1 and 2. It is pointed out that the rib 28 can not be too large as it could impede the bending of the flexible member when placing it on a bank.

The sockets 18 as shown in FIG. 3 may alternatively be formed in the manner shown in FIGS. 6, 7 and 8. In FIG. 6, the socket 18' is shown with bore 20' to one side of the axis A of the elongated flexible member. Both the socket 18' and the preferred socket 18 may be formed at the time the structure is originally molded.

As a second alternative a socket 18" is shown in FIG. 7 and 8. The socket shown as 18" also includes a bore-like aperture 20". Socket 18" is formed by folding back the end of the elongated flexible member and welding the end of the flexible member at a point 26 to form the bore 20". In this embodiment, the retainer can be cut from sheet material either with or without rib 28.

In order to properly utilize the flexible member on a bank, the first step is to score a trench 30 in the bank that will follow the bottom contour or the arcuate lower edge 16 when the structure is placed against the bank. This score or trench 30 is best shown in FIG. 2 where the original ground line is represented by the numeral 32. This step may be accomplished conveniently by forming the elongated flexible member 12 and forming it into a curve as shown in FIG. 3. In order to accomplish this step, one may use a string or the like, such as string 34 that has fixed at one end an eye 36 and at the other end a hook 38. By inserting the spikes 22 into the bores 20, this looped string will then hold the elongated flexible member in its arcuate shape as shown in FIG. 3. As can be ascertained from FIG. 3, string 34 is 4/3L in length. When L is 34 inches, (86.36 cm) string 34 is 45.33 inches (115.15 cm). The elongated flexible member may then be placed against the bank and a line scratched on the bank. The flexible member 12 is removed and the score 30 conveniently formed with a pick or the like in the bank. Once this is accomplished the flexible member 12 may be placed in the scored trench 30 and the spikes 22 driven into the ground with a hammer or sledge. Once the elongated flexible member 12 is anchored in this manner to the bank, then the string 34 may be removed and used with the next flexible member.

Referring now to FIG. 2, a pit or a hole 40 can be formed behind the flexible member 10 with at least some of the dirt thrown up against the elongated flexible member 12 on the downhill side of the bank to form a berm 42 around the perimeter of the elongated flexible member 12. The plant 44 may then be placed in the hole 40 and planting material 46 added to the hole as appropriate.

The berm 42 should extend above the level 48 of the planting material 46 so that when the plant 44 is watered, a reservoir is formed within the perimeter of the berm 42 and water is not permitted to run down adjacent the edge of the elongated flexible member and be lost from the planting hole 40.

In clay soils, it may be appropriate for the hole 40 to be dug so that appropriate drainage from the hole will occur after watering of the plant. This, in some instances, may include utilization of the score line 30, however this is not necessary in soil where drainage is adequate.

While this invention has been described with a particular embodiment in mind, it should be clear that the invention is limited only as indicated in the claims which are appended hereto.

What we claim is:

1. A method of planting a plant on a bank using an arucate soil retainer comprising the steps of:
   (a) placing said arcuate soil retainer against said bank so that the arcuate lower edge is on the bank in order to trace the outline of said arcuate soil retainer on the bank;
   (b) scoring a semi-circular line on the surface of the bank coincident with the traced outline with the open side of said semi-circle facing uphill;
   (c) placing the arcuate soil retainer in the scored semi-circle;
   (d) fixing the arcuate soil retainer to the bank with at least two spikes;
   (e) excavating a pit behind said soil retainer on the uphill side thereof;
   (f) forming a berm around the inside of said arcuate soil retainer;
   (g) placing a plant in said excavated pit; and
   (h) filling said excavated pit with planting material.

2. The method of claim 1 wherein said arcuate soil retainer is formed from an elongated flexible member, including the step of forming said arcuate soil retainer in an arcuate relationship and holding said arcuate soil retainer in said arcuate shape prior to placing the arcuate soil retainer against the bank to trace the outline thereof.

* * * * *